United States Patent [19]

Brandstatter

[11] Patent Number: 4,521,385

[45] Date of Patent: Jun. 4, 1985

[54] RECOVERY OF TITANIUM VALUES

[75] Inventor: Hans G. Brandstatter, Welland, Canada

[73] Assignee: Ontario Research Foundation, Sheridan Park, Canada

[21] Appl. No.: 470,070

[22] Filed: Feb. 28, 1983

[30] Foreign Application Priority Data

Mar. 2, 1982 [GB] United Kingdom ................. 8206846

[51] Int. Cl.$^3$ ............................................. C01G 23/02
[52] U.S. Cl. ........................................ 423/76; 423/69; 423/79; 423/80
[58] Field of Search ........................ 423/79, 80, 69, 76

[56] References Cited

U.S. PATENT DOCUMENTS 2,928,724  3/1960  Mason et al. .......................... 423/79
3,218,152  11/1965  Sasabe ................................... 423/80
3,900,552  8/1975  Hunter et al. ......................... 423/79

Primary Examiner—H. T. Carter
Attorney, Agent, or Firm—Sim & McBurney

[57]  ABSTRACT

Titanium and iron values are recovered from ores, concentrates and slags by effecting solid-state reduction and carburization to form titanium carbide and carburized iron, separation of the carburized iron, and low temperature chlorination of the titanium carbide to gaseous substantially pure titanium tetrachloride, which may be oxidized to pigmentary titanium dioxide.

6 Claims, No Drawings

RECOVERY OF TITANIUM VALUES

FIELD OF INVENTION

The present invention relates to the recovery of titanium and iron values for titanium- and iron-bearing materials.

BACKGROUND TO THE INVENTION

The formation of titanium carbide from various titanium oxide-containing materials as an intermediate for the formation of pigmentary $TiO_2$ is known. The reaction which produces the titanium carbide in the prior art is carburization of the titanium oxide-containing material, usually in the form of a slag from ore processing.

Titanium occurs with iron in natural deposits of ilmenite ore. The titanium and iron values are present in the form of their oxides (FeO. $TiO_2$), along with gangue constituents, mainly alumina, silica, magnesia and lime. One prior art procedure for the recovery of the titanium and iron values from the ore is described in U.S. Pat. No. 3,899,569 and in "Titanium Carbide from Domestic Titanium Ores" by W. L. Hunter et al, TMS/AIME Preprint A73-18, Ch. 73, pp 257 to 270.

In this known procedure, electric furnace smelting of ilmenite with coke and lime is effected under conditions which favour reduction of iron oxide to iron, to result in a pig iron product and a slag in which the titanium values are mainly in the form of calcium titanate. The slag is subjected to a solid state carburization reaction at high temperatures of from about 1850° to about 3150° C. to form a mixture of calcium, titanium, iron and aluminum carbides. Silica present in the slag is reduced to SiO and is volatilized. The mixed carbides are cooled, crushed and reacted with water, thereby forming acetylene and calcium hydroxide from the calcium carbide and liberating the titanium carbide.

The titanium carbide then may be chlorinated at relatively low temperatures usually in the range of about 200° to about 500° C. to selectively convert the titanium carbide to pure gaseous titanium tetrachloride, while leaving any impurities in the solid phase. The titanium tetrachloride then may be oxidized to high purity pigmentary $TiO_2$.

While this prior art process is attractive, in that the titanium values are provided in the form of pure $TiCl_4$, from which pure $TiO_2$ pigment may be readily produced, and iron is also recovered in a useful form, the procedure suffers from the drawback that a considerable energy requirement is needed to effect first the smelting and then the high temperature carburization of the slag and that a multiple number of processing steps is required to be effected on the ore before titanium carbide suitable for chlorination results.

SUMMARY OF THE INVENTION

In accordance with the present invention, there is provided an improved process for the recovery of titanium and iron values from titanium- and iron-bearing materials, including ores, concentrates and slags, which is an improvement on the prior art process.

In the present invention, a solid state carburization reaction is effected on the titanium- and iron-bearing material to convert the titanium values to titanium carbide (TiC) and to convert the iron values to carburized iron, while the gangue materials remain relatively unaffected.

Separation of the carburized iron from the titanium carbide and gangue materials may be effected by any convenient physical separation technique, usually by a magnetic separation operation in which the carburized iron is the magnetic fraction and the titanium carbide and gangue materials are the non-magnetic fraction. The titanium carbide is recovered in a form suitable for the low temperature chlorination operation to form gaseous titanium tetrachloride from which pure pigmentary $TiO_2$ can be derived. In a preferred embodiment of the invention, the non-magnetic fraction may be further processed to separate the titanium carbide from gangue components prior to the chlorination of the titanium carbide.

By effecting a single step reduction of titanium and iron values to carbide and metallic form and simple physical separation of the product into an iron fraction and a titanium fraction in this invention, an improved process results, which avoids the prior art necessity for two high temperature reduction operations, namely a smelting operation followed by a carburization operation, the necessity for chemical reaction of the products of carburization to provide the titanium carbide in a suitable form for chlorination, the necessity to handle acetylene gas, and the general air pollution characteristics of smelting processes.

GENERAL DESCRIPTION OF INVENTION

The present invention is concerned with the separate recovery of iron and titanium values from any iron- and titanium-bearing material which also contains gangue components. The material usually is in the form of an ore, preferably ilmenite, or a concentrate thereof, although the material also may take the form of a by-product slag. The iron and titanium values are usually present in the starting materials in the form of oxides, although they may be present in the form of carbonates and/or hydroxides, and in association with gangue components, usually in the form of silica, alumina, magnesia and lime. The relative proportion of the components of the starting material depend on the source of the material. For example, Canadian ilmenite ore usually contains about 30% $TiO_2$, about 50% iron oxides and about 20% gangue.

The titanium- and iron-containing starting material on which the process of the present invention is to be effected is first formed into an intimate admixture with finely divided carbon. To achieve the intimate admixture, the starting material is reduced to particulate form, for example, −100 mesh, and thoroughly mixed with powdered carbon. The carbon may be in any convenient elemental form, for example, graphite, coal or coke.

The quantity of carbon used usually is at least sufficient to reduce all the titanium values to titanium carbide and all the iron values to carburized iron, the latter material being essentially elemental metallic iron containing a small quantity of carbon, usually up to about 4 wt%, present as a solid solution and iron carbide ($Fe_3C$) in the metallic iron. A small stoichiometric excess of carbon may be used, typically up to about 110% of the theoretical carbon requirement. In order to maintain the intimate admixture of particular titanium- and iron-bearing material and finely divided carbon in a convenient form for processing, the intimate admixture may be formed into briquettes, pellets or other convenient stable physical shape, by the use of a suitable binder, such as, a clay.

Following formation of this intimate admixture of reactants, heating is effected in a suitable reaction vessel to a temperature of about 1200° to about 2300° C., preferably about 1500° to about 2000° C., to effect solid state reduction and carburization of the titanium and iron values by the carbon. Carbon monoxide is formed in the reactions and is removed from the reaction vessel in any convenient manner, such as, by flushing the reaction vessel with an inert gas, or by the application of vacuum to the reaction vessel.

The temperature of reaction affects the grain size of the titanium carbide and carburized iron, with lower temperatures favouring smaller grain sizes, typically from 20 to 40 microns, and higher temperatures favouring larger grain sizes, typically up to 300 to 400 microns. Since larger grain sizes permit more ready separation of the carburized iron from the titanium carbide, higher temperatures are preferred. In addition, at temperatures above about 1700° C., reaction tends to occur between some of the gangue components and the carbon, thereby consuming some carbon. The products of such gangue reduction tend to be volatile and hence pass out of the reaction vessel with the carbon monoxide stream, thereby bringing about a diminution of the proportion of gangue constituents present.

In this reduction and carburization reaction, therefore, both the titanium and iron values are treated with carbon in a single high temperature operation, while the gangue components are largely unaffected, although, as noted above, there may be some reaction to form volatile components, which thereby diminishes the proportion of gangue constituents present, but does not significantly alter the chemical form of the gangue materials.

The product which results from the reduction and carburization reaction comprises the titanium carbide, carburized iron and residual gangue material. Physical separation techniques may be used to effect separation of the carburized iron in substantially pure form from the titanium carbide. This separation of the carburized iron prior to chlorination of the titanium carbide is necessary for economic chlorine usage. Carburized iron is a desirable and saleable material useful in steel making.

A preferred manner of achieving physical separation of carburized iron from the titanium carbide is to use magnetic separation, typically wet magnetic separation although dry magnetic separation may be used. Preparatory to the magnetic separation, the product from the reduction and carburization reaction is broken up and ground to fine particle size, for example, $-325$ mesh, to facilitate separation of the magnetic carburized iron fraction from the non-magnetic titanium carbide and gangue components. After an initial separation of magnetic from non-magnetic material, the magnetic fraction may be subjected to one or more additional grindings and magnetic separations to ensure the complete separation of non-magnetics from the magnetic fraction. There is thereby obtained a magnetic fraction comprising carburized iron substantially free from titanium or other impurities.

The non-magnetic fraction which results from this physical separation procedure comprises titanium carbide and gangue materials substantially free from carburized iron. The titanium carbide content of this material may be chlorinated by reaction with gaseous chlorine to form gaseous substantially pure titanium tetrachloride. The chlorination usually is effected at a temperature of about 200° to about 500° C., preferably below 300° C.

At these preferred temperatures, chlorides of iron and some of the gangue materials are non-volatile and hence remain in the solid phase. The substantially pure gaseous titanium tetrachloride which results from the chlorination is subjected to selective condensation, and thereafter may be processed in known manner to produce pigmentary titanium dioxide.

In a preferred embodiment of the invention, the titanium carbide and gangue components may be subjected to further processing to separate the titanium carbide from the gangue components prior to chlorination of the titanium carbide. Such further processing preferably is effected by grinding the fraction to a very fine particle size, for example, $-20$ microns, and subjecting the resulting suspension of particles to selective flocculation to flocculate and deposit titanium carbide separate from gangue materials.

The further processed and thereby purified titanium carbide then is subjected to chlorination to form the substantially pure gaseous titanium tetrachloride. Since the titanium carbide is recovered in a more pure form, with less gangue material present, less chlorine is required in the chlorination step, since less chlorides are formed with gangue material. Again, substantially pure titanium chloride results from the chlorination step and may be processed to produce pigmentary titanium dioxide.

The overall procedure which is involved in the present invention, therefore, is the recovery of titanium values from ilmenite ores or other sources and the conversion thereof to pigmentary titanium dioxide while at the same time recovering iron in carburized metallic form. The process involves only a single stage high temperature treatment of the ore and simple beneficiation procedures to effect recovery of the products of the reduction reactions. Titanium carbide in a form suitable for chlorination results directly from the ore treatment, requiring only the separation of the metallic iron carbide.

The process of the present invention, therefore, is much simpler and easier to effect when compared with the prior art process referred to above, and leads to an improved and economic process for producing pigmentary titanium dioxide and carburized metallic iron.

EXAMPLES

Example 1

Ilmenite concentrate containing 30.3 wt% $TiO_2$, 27.2 wt% FeO, 22.1 wt% $Fe_2O_3$ and the balance gangue was subjected to solid-state reaction with carbon in ore-coke briquettes in a carbon monoxide atmosphere. The briquettes were formed from intimate admixtures of $-100$ mesh particles of both ore and coke by binding with bentonite clay. The coke was present in an amount of about 109% of the amount stoichiometrically required to convert all the iron oxides to carburized iron and the titanium oxide to TiC.

Temperatures of up to 2000° C. for up to 3 hours were used in separate experiments. The products were ground to $-325$ mesh and separation of carburized iron from titanium carbide and gangue was accomplished using dry magnetic separation.

The TiC product exhibited an average grain size of 20 microns when the solid-state reaction was effected at 1700° C. while considerably larger grains (150 microns) were obtained at 2000° C.

The following Table I reproduces typical results for solid-state reduction and carburization effected at 1700° C.:

ing operations were repeated until no further non-magnetic fractions were evolved.

The following Table III reproduces the results ob-

TABLE I

| | Wt. (g) | Grade Wt. % | | | | | | | | Distribution % | | | | | | |
|---|---|---|---|---|---|---|---|---|---|---|---|---|---|---|---|---|
| | | TiO₂ | TiC | C | T.Fe | SiO₂ | Al₂O₃ | CaO | MgO | TiO₂ | C | T.Fe | SiO₂ | Al₂O₃ | CaO | MgO |
| Ilmenite | 1250 | 30.3 | — | — | 36.6 | 8.93 | 3.56 | 1.87 | 2.11 | 100 | — | 99.8 | 72.9 | 71.3 | 97.8 | 97.1 |
| Coke | 437.5 | — | — | 91.5 | — | 5.3 | 2.2 | 0.1 | 0.01 | — | 100 | — | 15.1 | 15.8 | 1.8 | .2 |
| Bentonite binder | 33.7 | — | — | — | 2.48 | 54.3 | 19.9 | 0.3 | 2.2 | — | — | 0.2 | 12.0 | 11.1 | .4 | 2.7 |
| Feed | 1721.2 | | | | | | | | | 100 | 100 | 100 | 100 | 100 | 100 | 100 |
| Carburized Ore 1700° C. | 996 | — | 29.03 | 9.3 | 47.8 | 12.4* | 5.0* | 3.75* | 2.3* | 101.8 | 23.1 | 103.9 | 80.7 | 81.9 | 156 | 84.3 |

*Typical data from other test results, 12.4% SiO₂ represents 8.27 wt % SiC actually present in the sample.

In Table II, there are shown typical results obtained tained for the magnetic separation procedure:

TABLE III

Magnetic Separation Material Balance

CONDITIONS:
Magnetic separator: Davis Tube   Water flow Rate: 230 mL/min.
Stroke: 72 strokes/min.   Magnetic Field: 100 gauss (1.75 amps)

| Description | Wt. (g) | Wt. % | Metallic Grade | | | Carbide Grade | | Distribution | | |
|---|---|---|---|---|---|---|---|---|---|---|
| | | | Fe % | Ti % | C % | T.Fe % | TiC % | Fe % | Ti % | C % |
| 44 micron carburized ilmenite | | | | | | | | | | |
| Head | 186.5 | 100.0 | 49.8 | 26.1 | 7.0 | 53.3 | 32.6 | 100.0 | 100.0 | 100.0 |
| Mags | 134.2 | 72.0 | 68.6 | 12.8 | 2.4 | 73.5 | 16.0 | 99.2 | 34.5 | 58.4 |
| Non-mags | 52.3 | 28.0 | 1.5 | 60.5 | 10.4 | 1.6 | 75.6 | 0.8 | 64.8 | 41.6 |
| Magnetic Reground to ~20 micron | | | | | | | | | | |
| Head | 100.7 | 100.0 | 68.6 | 18.7 | 1.18 | 73.5 | 16.0 | 100.0 | 100.0 | 100.0 |
| Mag | 77.0 | 76.5 | 87.8 | 3.8 | 0.65 | 94.1 | 4.8 | 98.0 | 15.5 | 41.1 |
| Non-Mag 2 | 23.7 | 23.5 | 5.8 | 66.7 | 2.93 | 6.2 | 83.4 | 2.0 | 84.5 | 58.4 | when an ore, subjected to solid-state reduction and carburization at 2000° C., was quenched in water at 1250° C., ground to −100 mesh and room temperature, ground to −325 mesh under ice, and then subjected to dry or wet magnetic separation:

TABLE II

| Fraction | Wt. (g) | Grade - Wt % | | Distribution % | |
|---|---|---|---|---|---|
| | | T.Fe | Ti as TiC | T.Fe | Ti as TiC |
| Mags | 2.81 | 71.9 | 8.32 | 93.0 | 17.9 |
| Non-Mags | 1.91 | 7.92 | 56.1 | 7.0 | 82.1 |

The results of the above Tables I and II show that metallic titanium carbide was obtained directly from ilmenite ore by solid-state reduction and carburization, and was readily separated from gangue material.

Example 2

Solid state carburization of ilmenite concentrate in briquettes of intimately admixed finely divided ore and coke was effected at 2000° C. as described in Example 1. The briquettes were crushed and ground to −325 mesh (44 microns). The particulate material was subjected to wet magnetic separation in a Davis tube at 1000 gauss.

The non-magnetic fraction was collected while the magnetic fraction which remained in the magnetic field was reground to about 20 microns and reprocessed through the Davis tube. The regrinding and reprocess- As may be seen from the above Table III, a high purity iron product results from the magnetic separation procedure while the non-magnetic fraction contains only a low proportion of iron.

The non-magnetic fraction was treated with ancillary reagents and selectively flocculated and elutriated to separate gangue materials. The non-magnetic fraction first was pulped to 5.0% solids and then the following reagents were added to the pulp:

| sodium hydroxide | 7.7 kg/t |
|---|---|
| reagent S-3223 | 12.3 kg/t |
| ammonium sulphate | 12.3 kg/t |
| wheat starch | 0.15 kg/t |

The resulting mixture was agitated lightly for 5 minutes and allowed to settle for 5 minutes. The settled mixture then was elutriated with the following reagents made up in deionized water:

| sodium hydroxide | 50 ppm |
|---|---|
| reagent S-3223 | 120 ppm |
| ammonium sulphate | 120 ppm |
| wheat starch | 5 ppm |

The elutriation was allowed to continue until no suspended solids were observed. The total elapsed time of elutriation was 40.18 minutes using 4.12 liters of liqud at a flow rate of 102.56 ml/min.

The following Table IV reproduces the results obtained for the selective flocculation/elutriation procedure:

TABLE IV

| | | | Selective Flocculation/Elutriation Material Balance | | | | | | | |
|---|---|---|---|---|---|---|---|---|---|---|
| | Wt. | Wt. | Metallic Grade | | | Carbide Grade | | DISTRIBUTION | | |
| Description | (g) | (%) | Fe % | Ti % | C % | T.Fe % | TiC % | Fe % | Ti % | C % |
| Non-Magnetic (TiC) Fraction | | | | | | | | | | |
| Calculated Head | 13.0 | 100.0 | 1.5 | 50.9 | 10.4 | 1.6 | 63.7 | 100.0 | 100.0 | 100.0 |
| Overflow | 4.3 | 33.0 | 1.3 | 0.29 | 20.6 | 1.4 | 0.36 | 28.5 | 0.1 | 65.9 |
| Underflow | 8.7 | 67.0 | 1.6 | 76.0 | 5.3 | 1.7 | 95.0 | 71.5 | 99.9 | 34.1 |

NOTE: Total dispersion until the wheat was added in the non-magnetic fraction

As may be seen from the results of the above Table IV, there is obtained from the elutriation titanium carbide of high purity and only contaminated with iron to a minor degree.

SUMMARY OF DISCLOSURE

In summary of this disclosure, the present invention is directed to an improved process for the recovery of titanium and iron values from titanium- and iron-containing materials involving simultaneous solid state reduction and carburization of the metals, subsequent beneficiation to separate titanium carbide and carburized iron, and chlorination of the titanium carbide to substantially pure titanium tetrachloride from which pigmentary titanium dioxide may be formed.

What I claim is:

1. A method for the separate recovery of iron and titanium values in substantially pure form from an iron- and titanium-containing ore or ore concentrate wherein the iron and titanium values are in oxide, carbonate and/or hydroxide form and which also contains gangue constituents comprising at least one oxide selected from the group consisting of silica, alumina, magnesia and lime, which comprises:

blending said iron- and titanium-containing ore or ore concentrate in finely divided form with finely divided carbon in at least a stoichiometric amount to convert said titanium to titanium carbide and said iron to carburized iron containing no more than about 4 wt.% of carbon, heating said blend in a reaction zone to a temperature of about 1200° to about 2300° C. to initiate and sustain a single step solid-state reducing and carburization reaction to convert substantially all the titanium values to titanium carbide and substantially all the iron values to carburized iron containing no more than 4 wt.% carbon while said gangue constituents remain relatively unaffected, whereby said titanium carbide and carburized iron are obtained in a single treatment step from the ore or concentrate by a solid state reaction, subjecting said heated blend to magnetic separation to separate a magnetic fraction comprising at least a substantial proportion of the iron values in the form of carburized iron from a non-magnetic fraction comprising at least a substantial proportion of the titanium values in the form of titanium carbide and said relatively unaffected gangue constituents, and chlorinating said non-magnetic fraction to selectively form titanium tetrachloride from said titanium carbide while leaving substantially unaffected said gangue constituents, thereby achieving separation of the titanium values in substantially pure form.

2. The method of claim 1, wherein said iron- and titanium-containing material comprises ilmenite ore or a concentrate thereof.

3. The method of claim 2 wherein said ilmenite ore or concentrate thereof is intimately mixed in particulate form the particulate carbon.

4. The method of claim 1 wherein said solid-state reaction is carried out at a temperature of about 1500° to about 2000° C.

5. The method of claim 1, wherein said non-magnetic fraction is subjected to further beneficiation to effect separation of titanium carbide from gangue constituents prior to said chlorination.

6. The method of claim 1 wherein said chlorination is effected at a temperature of about 200° to about 500° C.

* * * * *